US009290631B2

(12) United States Patent
Olson et al.

(10) Patent No.: US 9,290,631 B2
(45) Date of Patent: Mar. 22, 2016

(54) ADHESIVE FORMULATIONS FOR BONDING COMPOSITE MATERIALS

(75) Inventors: Daniel Robert Olson, Bend, OR (US); Wendy Lin, Niskayuna, NY (US); George Thomas Seeger, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 805 days.

(21) Appl. No.: 12/046,844

(22) Filed: Mar. 12, 2008

(65) Prior Publication Data
US 2009/0229747 A1    Sep. 17, 2009

(51) Int. Cl.
| | |
|---|---|
| *C09J 5/00* | (2006.01) |
| *B32B 7/12* | (2006.01) |
| *B32B 27/00* | (2006.01) |
| *C09J 4/00* | (2006.01) |
| *C09J 101/00* | (2006.01) |
| *C09J 201/00* | (2006.01) |
| *C08F 4/00* | (2006.01) |
| *C08J 5/24* | (2006.01) |
| *C09J 131/02* | (2006.01) |
| *B32B 5/02* | (2006.01) |
| *B32B 5/26* | (2006.01) |
| *B32B 7/06* | (2006.01) |

(52) U.S. Cl.
CPC . *C08J 5/24* (2013.01); *B32B 5/024* (2013.01); *B32B 5/26* (2013.01); *B32B 7/06* (2013.01); *B32B 7/12* (2013.01); *C09J 4/00* (2013.01); *C09J 131/02* (2013.01); *B32B 2260/021* (2013.01); *B32B 2260/023* (2013.01); *B32B 2260/046* (2013.01); *B32B 2262/0261* (2013.01); *B32B 2262/0276* (2013.01); *B32B 2262/101* (2013.01); *B32B 2262/106* (2013.01); *B32B 2307/306* (2013.01); *B32B 2307/50* (2013.01); *B32B 2307/712* (2013.01); *B32B 2307/714* (2013.01); *B32B 2307/718* (2013.01); *B32B 2307/734* (2013.01); *B32B 2603/00* (2013.01); *C08J 2363/10* (2013.01)

(58) Field of Classification Search
USPC ............................ 156/305, 332, 337; 526/118
See application file for complete search history.

(56) References Cited

U.S. PATENT DOCUMENTS

| | | | |
|---|---|---|---|
| 4,695,508 A | | 9/1987 | Kageyama |
| 5,206,077 A | | 4/1993 | Cowley et al. |
| 5,288,767 A | | 2/1994 | Cramer et al. |
| 5,380,775 A | * | 1/1995 | Cowley et al. ............... 524/109 |

(Continued)

FOREIGN PATENT DOCUMENTS

| | | |
|---|---|---|
| EP | 1424378 A2 | 6/2004 |
| EP | 1 764 382 A1 | 3/2007 |

(Continued)

OTHER PUBLICATIONS

English machine translation of WO 2007/144942, retrieved from WIPO database Jul. 10, 2015.*

(Continued)

*Primary Examiner* — Timothy Kennedy
(74) *Attorney, Agent, or Firm* — Ann M. Agosti

(57) ABSTRACT

Adhesive formulations generally including an acrylate and/or methacrylate monomer; a vinyl ester resin having a weight average molecular weight ranging from about 450 to about 3000; and a catalyst. Also disclosed is a method for forming a composite material employing the formulations.

25 Claims, 2 Drawing Sheets

(56) References Cited

U.S. PATENT DOCUMENTS

| | | | |
|---|---|---|---|
| 5,439,956 | A | 8/1995 | Noguchi |
| 5,660,527 | A | 8/1997 | Deering et al. |
| 5,756,600 | A | 5/1998 | Okumura |
| 5,843,354 | A * | 12/1998 | Evans et al. .............. 264/136 |
| 6,004,900 | A * | 12/1999 | O'Brien, III .............. 503/227 |
| 6,454,536 | B1 | 9/2002 | Evans et al. |
| 6,468,662 | B1 | 10/2002 | Nava |
| 6,602,958 | B2 | 8/2003 | Briggs et al. |
| 6,884,841 | B2 | 4/2005 | Nava |
| 7,294,657 | B2 | 11/2007 | Olson et al. |
| 7,981,944 | B2 | 7/2011 | Weber et al. |
| 2001/0053820 | A1 * | 12/2001 | Yeager ............... C08G 65/485 525/186 |
| 2002/0177027 | A1 * | 11/2002 | Yeager ............... C08G 65/485 252/511 |
| 2004/0170850 | A1 | 9/2004 | Nava |
| 2005/0043430 | A1 | 2/2005 | Weber et al. |
| 2007/0087123 | A1 | 4/2007 | Weber et al. |

FOREIGN PATENT DOCUMENTS

| | | |
|---|---|---|
| EP | 1764382 A1 | 3/2007 |
| JP | 09194550 A | 7/1997 |
| JP | 2004351712 | 12/2004 |
| JP | 2004351712 A | 12/2004 |
| JP | 2005054107 | 3/2005 |
| JP | 2005054107 A | 3/2005 |
| JP | 2006257289 | 9/2006 |
| JP | 2006257289 A | 9/2006 |
| WO | 9943726 A1 | 9/1999 |
| WO | WO 2004092787 A1 | 10/2004 |
| WO | 2005040295 A1 | 5/2005 |
| WO | 2007144942 A1 | 12/2007 |

OTHER PUBLICATIONS

Harper, C.A. et al., Plastics Materials and Processes: A Concise Encyclopedia, 2003, p. 250, John Wiley & Sons, Inc., Hoboken, NJ.
Abstract of JP2005054107 published Mar. 3, 2005.
Abstract of JP2004351712 published Dec. 16, 2004.
Abstract of JP2006257289 published Sep. 28, 2006.
Abstract of JPH 09194550 published Jul. 29, 1997.
Office Action issued in connection with corresponding DK Application No. PA200900326 on Mar. 31, 2014.
Office Action issued in connection with corresponding CN Application No. 200910134655.7 on Apr. 18, 2014.
Danish Office Action issued in connection with corresponding DK Application No. PA200900326 on Feb. 27, 2015.

* cited by examiner

ADHESIVE FORMULATIONS FOR BONDING COMPOSITE MATERIALS

BACKGROUND

Over recent decades many new composite materials have been developed, some with very valuable properties. Advanced composite materials are widely utilized in industry due to their high strength, low weight, high degree of stiffness, and stability against dimensional variation. By carefully choosing the reinforcement, the matrix, and the manufacturing process that brings them together, engineers can tailor the properties to meet specific requirements, such as resistance to heat, chemicals, and weathering by choosing an appropriate matrix material. The greatest advantage of composite materials is strength and stiffness combined with lightness. By choosing an appropriate combination of reinforcement and matrix material, manufacturers can produce properties that exactly fit the requirements for a particular structure for a particular purpose. The right composites also stand up well to heat and corrosion. This makes them ideal for use in products that are exposed to extreme environments such as boats, chemical-handling equipment, and alternative energy mechanisms such as wind turbines. In general, composite materials are very durable. Such composites also have a high level of chemical and thermal stability.

There is often a need to connect composite parts, preferably using an adhesive to provide the highest strength joint. One of the difficulties, however, is joining these composites together to form variously shaped structures. In particular, wind turbine manufacturers applications demand adhesives that can withstand the centrifugal forces applied to each blade. They must at the same time bond very large components, such as the two halves of a blade envelope and the spar, while filling substantial gaps that are inevitable with joint structures up to 60 meters long. They must then maintain bond strength for the blade's lifetime under constant thermal cycling and environmental attack. Bonds must endure outside ambient conditions with daily cycling, without yielding for up to 25 years.

One of the methods employed in joining composite parts is application of a paste adhesive. Paste adhesives can provide high strength joints, but are difficult to process due to their high viscosity. Epoxy adhesives can also provide high strength joints, but processing of epoxy adhesives can be difficult. Epoxy adhesives are made by combining an epoxy resin with a catalyst and begin to react on admixture. The reaction changes the viscosity, making processing difficult. Also, cure time can vary dramatically with temperature. Some epoxy systems cure so rapidly at temperatures above 90° F. that they become almost unusable. At colder temperatures, e.g., below 60° F., some systems may take days or more to cure. Other potential adhesive materials like polyesters or vinyl esters do not provide sufficient adhesive strength.

Not only must the adhesive provide durable bonding, it must also be easily processed so that it can be used in a variety of conditions in the field. Adhesives that are commercially available do not meet all the requirements of adhesive strength, working time, and processability necessary for the bonding of composite parts of wind turbines, for example.

Accordingly, there exists a need to durably attach composite parts to one another.

BRIEF SUMMARY

The present disclosure is directed to adhesive formulations and composites made therefrom.

In one embodiment, the disclosure provides for an adhesive formulation comprising an acrylate and/or methacrylate monomer, a vinyl ester resin having a weight average molecular weight ranging from about 450 to about 3000, and a catalyst.

In another embodiment, the disclosure provides for a method for adhesively attaching a first composite material to a second composite material comprising disposing an adhesive formulation between the first and second composite materials; wherein the adhesive formulation comprises an acrylate and/or methacrylate monomer, a vinyl ester resin having a weight average molecular weight ranging from about 450 to about 3000, and a catalyst; and curing the adhesive formulation to provide a lap shear strength 20% greater than strength using adhesive formulation without monomer between the first and second composite materials.

In still another embodiment, a method for forming a composite material comprises preparing an infusion resin; layering a plurality of dry fiber plies to create a dry laminate material; infusing the resin into the dry laminate material creating a fiber-reinforced resin composite, wherein the infusion resin comprises an acrylate and/or methacrylate monomer, a vinyl ester resin having a weight average molecular weight ranging from about 450 to about 3000, and a catalyst; and curing the infusion resin.

The disclosure may be understood more readily by reference to the following detailed description of the various features of the disclosure and the examples included therein.

BRIEF DESCRIPTION OF THE DRAWINGS

The figures below, wherein like elements are numbered alike, are for illustrative purposes only.

DETAILED DESCRIPTION

Figure 1:
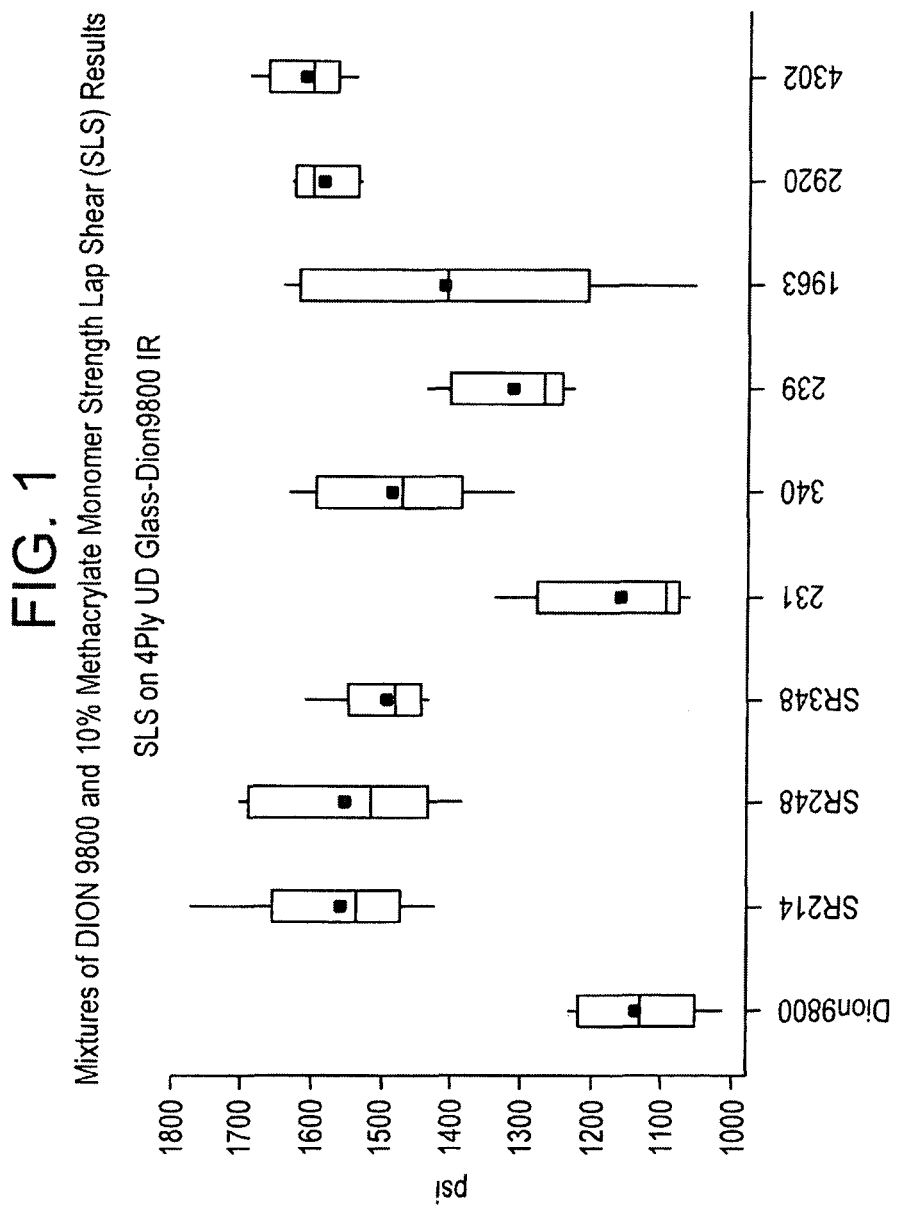
FIG. 1 demonstrates the results of lap shear strength testing of the present invention.

The present disclosure is directed to adhesive and resin formulations and composites made therefrom. More specifically, this disclosure is directed to novel mixtures of methacrylate monomers with vinyl ester resins, cured polymers prepared therefrom, and composite articles durably adhered to one another using said formulations. The adhesive formulation disclosed herein exhibits advantageous physical properties, including, but not limited to, increased bond strength, work life, and processability necessary for the bonding of composite parts. In particular, the adhesive formulation is suitable for bonding composite parts of a wind turbine.

The adhesive and resin formulation includes a methacrylate and/or acrylate monomer and a vinyl ester resin that are reacted in the presence of a catalyst. In one embodiment, one or more catalysts are added, and the resulting mixture is cured, or the resulting mixture is applied to a composite material and subsequently cured.

The acrylate and/or methacrylate monomers of formula I as shown below.

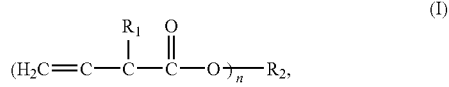

wherein $R_1$ is hydrogen or $C_1$-$C_{10}$ aliphatic radical; $R_2$ is selected from the group consisting of $C_1$-$C_{10}$ aliphatic radical, a $C_3$-$C_{30}$ aromatic radical and a $C_3$-$C_{20}$ cycloaliphatic radical, and n is an integer having a value of 1 to 4. In various embodiments, $R_2$ may include such groups as alkylene, hydroxyalkylene, alkoxy substituted aromatics. $R_2$ may also include urethane, ether, ester, or siloxanes linkages.

Suitable acrylate and/or methacrylate monomers according to the present disclosure include, but are not meant to be limited to, neopentyl glycol dimethacrylate, ethoxylated 2-bisphenol A dimethacrylate, phenoxyethyl methacrylate, aliphatic urethane acrylate oligomer, acrylated urethane, trimethylolpropane triacrylate, 1,4-butanediol diimethacrylate, low-viscosity aliphatic monoacrylate oligomer, trifunctional methacrylate ester, urethane methacrylate, and diethyleneglycol dimethacrylate.

Suitable vinyl ester resins are of low molecular weight. The term "low molecular weight" refers to the vinyl ester resin preferably having a weight average molecular weight ranging from about 450 to about 3000. Most preferably, the molecular weight ranges from about 500 to about 1500. For the purposes of the disclosure, a suitable vinyl ester resin can be prepared by reacting an unsaturated monocarboxylic acid or anhydride with an epoxy resin. In one embodiment, the reactants are employed in amounts that provide a ratio of acid groups per epoxy group ranging from about 0.95:1 to about 1.05:1, with the ratio preferably being about 1:1. The reaction between the unsaturated monocarboxylic acid or anhydride and epoxy resin can be carried out at temperatures ranging from about 90° C. to 130° C. in some embodiment, from about 100° C. to 120° C. in other embodiments, and from about 105° C. to 110° C. in still other embodiments, for a sufficient time to complete the reaction. The reaction is usually considered complete when the percent acid remaining has reached a value of 1 or less. The reaction time is usually from about 3 to 6 hours.

Exemplary acids and anhydrides which may be used in forming the vinyl ester resins include (meth)acrylic acid or anhydride, α-phenylacrylic acid, α-chloroacrylic acid, crotonic acid, mono-methyl and mono-ethyl esters of maleic acid or fumaric acid, vinyl acetic acid, sorbic acid, cinnamic acid, and the like.

Epoxy resins which may be employed are known and include virtually any reaction product of a polyfunctional halohydrin, such as epichlorohydrin, with a phenol or polyhydric phenol. Suitable phenols or polyhydric phenols include, for example, resorcinol, tetraphenol ethane, and various bisphenols such as bisphenol-A, 4,4'-dihydroxydiphenylsulfone, 4,4'-dihydroxy biphenyl, 4,4'-dihydroxy-diphenylmethane, 2,2'-dihydroxydiphenyloxide, and the like. In accordance with the disclosure, the amount of bisphenol-A is limited to quantities which are suitable.

Any appropriate epoxy resin may be used in forming the vinyl ester resin. The epoxy resins typically have an average of more than one vicinal epoxy group per molecule with an unsaturated polycarboxylic acid. Novolac epoxy resins may also be used. Specific epoxy compounds include various glycidyl ethers of resorcinol; catechol; hydroquinone; bisphenol A; fluorine, phenol-, or cresol-aldehyde resins and halogenated (e.g., bromine) substituted derivatives thereof. Mixtures of any of the above epoxy resins may be used.

A catalyst may be used for promoting the reaction between the unsaturated polycarboxylic acid or anhydride and the epoxy resin. Suitable catalysts include, for example, tris(dimethylaminomethyl)phenol, tetraethyl ammonium bromide, tetramethyl ammonium chloride, zirconium hexanoate, triphenyl phosphine, and the like. Any combination of the above may be used. Particularly suitable catalysts include, for example zirconium hexanoate or triphenyl phosphine, or any combination thereof and the like. The catalysts are usually employed in amounts of from about 0.03 to about 0.15, preferably from about 0.05 to 0.1, most preferably from about 0.06 part of catalyst per 100 parts of resultant mixture of the polycarboxylic acid or anhydride and the epoxy resin. The vinyl ester resin composition can further include a reactive diluent consisting of an ethylenically unsaturated monomer which participates to the cross-linking of the vinyl ester resin during subsequent curing thereof. Examples of suitable reactive diluents which may be used include styrene, vinyl toluene, alpha-methylstyrene, tert-butyl styrene, and 2-vinyl pyrrolidone, divinylbenzene as well as the methyl, ethyl, isopropyl and octyl esters of acrylic or methacrylic acid. Styrene is preferred. The reactive diluent is generally present in the resin composition of the invention in an amount of about 40 to about 60 weight %, based on the total weight of the composition.

In an exemplary embodiment, the vinyl ester resin employed is DION-9800-05A vinyl ester, available from Reichhold Chemicals, Inc., Research Triangle Park, N.C.

As noted above, the adhesive formulation includes an acrylate and or methacrylate monomer, a vinyl ester resin, and a catalyst. Suitable adhesive formulation catalysts include, for example, cobalt napthenate, acetylacetone, methyl ethyl ketone peroxide, cobalt octoate, N,N-dimethyl aniline, N,N-dimethyl acetamide, and N,N-dimethyl para-toluidine. Mixtures of the above may be used. In one embodiment, the catalyst is employed in amounts from about 0.05 to 1.5% by weight. The amount of catalyst employed can be varied to achieve desired workable lifetime of the adhesive, particularly where longer workable lifetimes may be desirable for commercial utility.

The adhesive formulation, upon curing, will provide a glass transition temperature that will vary depending on the exact methacrylate monomer and the cure process. The glass transition temperature (Tg) of representative compositions has been measured using Dynamic Mechanical Analysis (DMA). Various mixtures of Sartomer SR 240 phenoxyethyl methacrylate with DION 9800-05A were prepared and catalyzed with 0.2% cobalt napthenate and 1.2% MEKP-9H peroxide. After curing at 60° C. for 90 minutes, the glass transition temperatures (Tg) of the mixtures were measured using DMA. Table 1 below illustrates the results of the glass transition testing, wherein the percent phenoxyethyl methacrylate was varied in the formulation of the adhesive composition. In a preferred embodiment for the bonding of composite parts, a glass transition temperature of at least 70° C. is desirable. Therefore, according to the results of the sampling, a mixture of 20% or less of methacrylate monomer would be desirable.

TABLE 1

| Phenoxyethyl methacrylate (%) | Glass transition temperature (° C.) |
| --- | --- |
| 10 | 92 |
| 20 | 80 |
| 30 | 45 |
| 40 | 50 |
| 50 | 12 |

The working time of the adhesives can be controlled and varied by the catalysts employed. In one embodiment, the working time (time to cure) is generally greater than 1 hour. By way of example, an adhesive formulation was made by combining 10% of Sartomer SR340 phenoxyethyl methacrylate, 90% of DION 9800-05A, 0.22 pbw of 6% cobalt napthenate, and 1.21% of MEKP-9H peroxide. An aliquot with nothing else remained workable for 50 minutes. A second aliquot containing 0.09% of acetylacetone had a workable life of 65 minutes, and a third aliquot with 0.19% acetylacetone had a workable life of 180 minutes. Thus, the workable lifetime can be controlled. Preferably, the workable lifetime of the adhesive formulation is greater than 1 hour. The results for workable lifetime are summarized below in Table 2.

TABLE 2

| Acetylacetone (%) | Workable life (minutes) |
|---|---|
| 0 | 50 |
| 0.09 | 65 |
| 0.19 | 180 |

The low viscosities of the novel mixtures also allow for processes for durably adhering composite parts. The formulations can have viscosities less than 500 centipoise thereby making them easily processable. As such, the bondline between two composite substrates can range from about 5 to about 10 microns up to around 1 centimeter. Since the formulations are substantially nonviscous and flow readily, a mat of material can be used in the bondline to wick up the adhesive and hold it in place before curing.

Suitable materials to be bonded by the adhesive formulation include, for example, composite parts made by curing resins such as epoxies, polyesters, or vinyl esters with a woven fiberglass or carbon cloth. In an exemplary embodiment, the present disclosure provides a method of bonding composite components of wind turbines. The adhesive materials disclosed herein are more readily processed than prior art adhesives. As such, they provide the opportunity to bond composite parts together in circumstances where prior art adhesives do not work. For example, to increase efficiency, larger wind turbines with longer wind turbine blades are desirable. However, turbine blades that are too long cannot be economically transported to wind farm sites. It is economically feasible to transport wind turbine blades to wind farm sites when a blade is made in two sections in a factory and then transported. Viable adhesives for wind turbine blade composites must have a glass transition temperature greater than 70° C., have a work life of greater than 1 hour, be able to fill all the gaps in 20 mm bondlines (estimated to requires viscosities less than 500 centipoise), and have sufficient adhesive strength, e.g. greater than 1400 psi in a single lap shear testing. This disclosure provides for a facile way to fasten the two blade sections together by adhering composite components with the adhesive formulation of the present disclosure.

Figure 2:
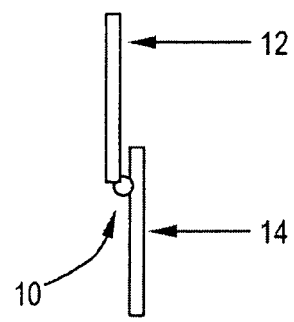
FIG. 2 is an exemplary embodiment of the adhesive material of the present invention used to bond two composite parts.

To form the structures from the individual composites, adhesion can be accomplished by any suitable method, which provides effective and intimate contact between the adhesive formulation and the composite material to be adhered. Optionally, an adhesion promoter can be used with the adhesive formulation and/or with the composite itself. FIG. 2 shows an exemplary embodiment of two composite parts (12, 14) joined by adhesive 10. In another exemplary embodiment, the adhesive described above is applied to at least one of the surfaces of the composites that are to be joined. The composites are forced together to expel any excess adhesive, which is removed, and the assembly then cured and fired. The assembly may be held in a vacuum bag during curing or if the assembly is too large or complex to use clamps or other conventional tools to hold the individual composites in contact until curing and firing are completed. In another exemplary embodiment, curing can take place in the presence of an inert gas, such as nitrogen. The curing can be accomplished by any suitable curing method, including but not limited to heat curing, thermal curing, or electron-beam curing.

In another embodiment of the present disclosure, the formulations disclosed herein have also been found to provide improved performance as infusion resins. Resin infusion is an advanced laminating technique used to enhance the quality and strength of fiberglass parts. By way of non-limiting example, the formulations of the present disclosure can be applied to a resin infusion process using a vacuum bagging technique, for example. In one embodiment, the formulations are used as infusion resins to form a composite wind turbine blade.

In one embodiment, a plurality of dry fiber plies are layered to create a dry laminate material. The orientation of the various plies is based on the desired directional strength of the resulting monolithic structure. At least one layer of an infusion resin, prepared according to the formulations of the present disclosure, is injected into the dry laminate material, and the resin may be injected in more than one location. For example, in addition injecting into a layer located atop the laminate material, resin may be injected into a layer beneath the laminate material. Next, a layer of peel ply may be added to the laminate material. The peel ply can be a tightly woven fabric such as nylon or polyester, for example, and impregnated with a release agent. Further, a layer of flow medium may be applied to enable resin to flow throughout the laminate material easily and not leave any dry patches. The flow medium can be any suitable material that allows for easy movement of the resin; in one embodiment it is a plastic mesh that can be structured in a honeycomb, crosshatch, or random swirl pattern. Next, the combination of the dry laminate material and resin layers, or layup, is positioned in contact with an evacuation conduit, such as one or more layers of breather tape. Then, the layup and the evacuation conduit are enclosed in a resin content control envelope through which the evacuation conduit passes. The resin content control envelope is then enclosed in a vacuum envelope. Next, gas within the vacuum envelope is evacuated. Due to the evacuation conduit, gas in the resin content control envelope and the dry laminate material is evacuated as the vacuum envelope is evacuated. Finally, the vacuum envelope and its contents are evacuated of gas. After the gas is evacuated, the injection line leading to a resin source is opened up and the pressure differential between the evacuated envelope and the resins source causes the resin to infuse into the dry laminate material creating a fiber-reinforced resin composite. In some applications the vacuum bag encloses the entire material, or in other applications a mold is used to form one face of the laminate with the bag being single sided to seal the outer face of the laminate to the mold. The open end is sealed, and air is drawn out with a vacuum pump. As a result, uniform pressure approaching one atmosphere is applied to the surfaces of the object inside the bag, holding parts together while the resin cures. The entire bag may be placed in a temperature-controlled oven, oil bath or water bath and gently heated to accelerate curing. Laminating of flat objects can be performed more efficiently in a heated laminating press, but when the objects are curved or have irregular shapes, a vacuum bag is normally used.

In yet another example, the dry laminate material and resin, made by the formulations of the present disclosure, are located on a tool, which may form part of the vacuum envelope. The tool may be separated from the dry laminate and resin by a release film, which then forms part of the resin content control envelope. The tool molds the adjacent surface of the fiber reinforced resin composite as it is being formed. In yet another embodiment, a second tool located on the other side of the dry preform and resin from the first tool is used to mold the opposed surface of the fiber reinforced composite structure as it is being formed. The tool can be separated from the upper resin by a release layer. Alternatively, the tool can be perforated and located between the resin and the dry preform, the perforations in the perforated tool allowing the resin to flow into the dry preform during curing. Finally, the vacuum bag, feed hoses, flow medium and peel ply are removed, and the infusion is complete.

The following examples are provided to illustrate the present invention and should not be construed as limiting thereof.

Tests were conducted in a laboratory to determine the effectiveness of the present invention. Several samples were prepared using different methacrylate monomers and adhesive strength, glass transition temperature, and workable lifetime was determined. The following examples are presented for illustrative purposes only, and are not intended to limit the scope of the invention.

Example 1

In this example, a composite substrate was made using 4 plies of glass and DION 9800-05A vinyl ester resin from Reichhold. Test bars were cut from the composite substrate and adhered to one another using a mixture of 10% methacrylate monomer with 90% DION 9800-05A was catalyzed with 0.2% Cobalt naphthenate (6%), 0.2% acetylacetone, and 1.2% MEKP-9H peroxide. MEKP-9H is a methyl ethyl ketone peroxide. The mixture was cured at ambient temperature overnight and then cured at 60° C. for 8 hours. Successive mixtures were made and tested using different methacrylate monomer samples. Monomers tested according to the above example included a diethyleneglycol dimethacrylate commercially available from Sartomer Company under the trade name SR231, a trifunctional methacrylate ester commercially available from Sartomer Company under the trade name SR9009, a neopentylglycol dimethacrylate commercially available from Sartomer Company under the trade name SR248, a butanediol dimethacrylate commercially available from Sartomer Company under the trade name SR214, an aliphatic urethane acrylate oligomer commercially available from Sartomer Company under the trade name CN2920, an ethoxylated BPA dimethacrylate commercially available from Sartomer Company under the trade name SR348, an aliphatic monoacrylate oligomer commercially available from Sartomer Company under the trade name CN152, an aliphatic polyester triurethane acrylate commercially available from Rahn AG under the trade name Genomer 4302, an aliphatic polyester based urethane dimethacrylate oligomer commercially available from Sartomer Company under the trade name CN1963, and a trifunctional methacrylate monomer commercially available from Sartomer Company under the trade name SR9011.

FIG. 1 shows the results of strength lap shear testing. Lap Shear determines the shear strength of adhesives for bonding materials. The test method is primarily comparative. Two specimens were bonded together with adhesive of the present disclosure and cured as specified. The test specimens were placed in the grips of an Instron universal testing machine and pulled until failure. As shown, the adhesive formulation containing the SR214 monomer provided an adhesive strength of 1560 psi; SR248 provided an adhesive strength of 1553 psi, SR348 provided an adhesive strength of 1493 psi, SR340 provided an adhesive strength of 1487 psi, CN2920 provided an adhesive strength of 1586 psi, and Rahn's Genomer 4302 provided an adhesive strength of 1613 psi.

All methacrylate monomers showed some improved adhesive strength, however, some monomers of the present disclosure showed greater improved adhesive strength than others. For example, the addition of 10% SR231 diethyleneglycol dimethacrylate to the DION 9800-05A vinyl ester resulted in an adhesive strength of 1160 psi, not significantly better than that obtained by use of DION 9800-05A alone. Not willing to be bound by any theory, it is speculated that an addition of diethylene glycol resulted in a more brittle formulation variation that suffered fracture earlier during lap shear testing.

Example 2

In this example, a first composite laminate was prepared by layering 5 layers of 15 inch by 15 inch unidirectional glass panels with a peel ply. Resins were infused using standard vacuum bagging techniques. The infused composites were allowed to gel at ambient temperature after which time they were post cured for 3.5 hours at 65° C. The peel ply was removed from the cured composite and Teflon brand tape was placed along one edge of the cured composite. A second composite laminate was prepared on top of the first laminate by laying down a 12 inch by 13 inch unidirectional glass panel on a cured peel ply surface. The same resin used to prepare the first composite laminate was allowed to gel at ambient temperature and then post cured for 3.5 hours at 65° C. The edges of the panel were trimmed and the panel was cut into 1 inch by 10 inch strips for adhesive strength testing. Testing was done using an Instron brand instrument to measure the force required to force apart the first and second composite laminates. The pound force was determined and the confidence interval was calculated (CI). Table 3 compares the results of adhesion strength testing conducted for DION 9800-5A vinyl ester, and for a formulation of DION 9800-05A with phenoxyethyl methacrylate commercially available from Sartomer Company under the trade name SR340. As shown in Table 3, the formulation of the present disclosure offers significantly improved adhesion compared to vinyl diester alone.

TABLE 3

| Composite tested | Load (lb$_f$) | 95% CI |
|---|---|---|
| DION 9800-05A | 3.6392 | 0.181 |
| DION 9800-05A with 15% SR340 | 12.26251 | 1.22387 |

Comparative Example 1

In this comparative example, a composite substrate was made using 4 plies of glass and using only DION 9800-05A vinyl ester resin without the addition of a methacrylate monomer. Test bars were cut from the composite substrate and adhered to one another using DION 9800-05A vinyl ester resin. After curing, lap shear testing established that the adhesive strength was 1133 psi. Therefore, the results shown using a mixture of the present invention comprising a vinyl ester resin in combination with methacrylate monomers show significant advantages in composite adhesion.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An adhesive formulation comprising:
   methacrylate monomer;
   a resin material; and
   a catalyst;
   wherein the resin material comprises vinyl ester resin having a weight average molecular weight ranging from about 450 to about 3000 and wherein the methacrylate monomer comprises phenoxyethyl methacrylate and/or ethoxylated 2-bisphenol A dimethacrylate.

2. The adhesive formulation of claim 1, wherein the catalyst is in an amount effective to provide a workable lifetime of the formulation for a period greater than one hour.

3. The adhesive formulation of claim 1, wherein the vinyl ester resin comprises a reaction byproduct of an unsaturated monocarboxylic acid or an anhydride with an epoxy resin.

4. The adhesive formulation of claim 1, wherein the catalyst comprises cobalt napthenate, acetylacetone, methyl ethyl ketone peroxide, cobalt octoate, N,N-dimethyl aniline, N,N-dimethyl acetamide, N,N-dimethyl para-toluidine, and combinations thereof.

5. The adhesive formulation of claim 1, wherein the catalyst comprises an amount of 0.05 to 1.5% by weight, based on the total weight of the adhesive formulation.

6. A method for adhesively attaching a first composite material to a second composite material comprising:
   disposing the adhesive formulation according to claim 1 between the first and second composite materials; and
   curing the adhesive formulation to form a cured adhesive formulation to attach the first composite material to the second composite material.

7. The method of claim 6, wherein the methacrylate monomer comprises phenoxyethyl methacrylate.

8. A method for forming a composite material, the method comprising:
   preparing an infusion resin formulation;
   layering a plurality of dry fiber plies to create a dry laminate material; infusing the infusion resin formulation into the dry laminate material for cr ting to create a fiber-reinforced resin composite, wherein the infusion resin formulation comprises the adhesive formulation of claim 1 and
   curing the infusion resin to form a cured infusion resin in the fiber-reinforced resin composite to form a composite material.

9. The method of claim 8, wherein the methacrylate monomer comprises phenoxyethyl methacrylate.

10. A composite material formed by the method of claim 8.

11. A composite laminate formed by the method of claim 9.

12. A composite material comprising:
    a dry laminate material comprising a layered plurality of dry fiber plies; and
    an infusion resin comprising the adhesive formulation of claim 1 wherein the infusion resin has been cured to bond at least a portion of the layered plurality of dry fiber plies together to form a bonded article.

13. The composite material of claim 12, wherein the methacrylic monomer comprises phenoxyethyl methacrylate.

14. The adhesive formulation of claim 1, wherein the vinyl ester resin further comprises an ethylenically unsaturated monomer.

15. The adhesive formulation of claim 14, wherein the ethylenically unsaturated monomer is present in an amount of about 40 weight % to about 60 weight % based on the total weight of the vinyl ester resin present in the adhesive formulation.

16. The method of claim 8, wherein the cured infusion resin has a glass transition temperature of greater than 70° C. and wherein the infusion resin has a viscosity of less than 500 centipoise.

17. The method of claim 8, wherein the vinyl ester resin further comprises an ethylenically unsaturated monomer.

18. The method of claim 6, wherein the adhesive formulation has a viscosity less than 500 centipoise.

19. The method of claim 6, wherein the cured adhesive formulation after curing has a glass transition greater or equal to 50° C.

20. The adhesive formulation according to claim 1 wherein the methacrylate monomer comprises phenoxyethyl methacrylate.

21. The adhesive formulation of claim 20, wherein the adhesive formulation has a viscosity less than 500 centipoise.

22. A method for adhesively attaching a first composite material to a second composite material comprising:
    disposing the adhesive formulation according to claim 20 between the first and second composite materials; and
    curing the adhesive formulation to form a cured adhesive formulation to attach the first composite material to the second composite material;
    wherein the adhesive formulation after curing has a glass transition temperature greater than or equal to 50° C.

23. The method of claim 22, wherein the adhesive formulation has a viscosity less than 500 centipoise.

24. The method according to claim 23 wherein the cured adhesive formulation has a glass transition temperature greater than 70° C.

25. The adhesive formulation of claim 1 wherein the methacrylate monomer comprises ethoxylated 2-bisphenol A dimethacrylate.

* * * * *